United States Patent
Okada et al.

(10) Patent No.: US 6,598,903 B2
(45) Date of Patent: Jul. 29, 2003

(54) AIRBAG WITH FLOW ADJUSTMENT MEMBER AND TETHER

(75) Inventors: Norihisa Okada, Tokyo (JP); Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 96 days.

(21) Appl. No.: 09/922,248

(22) Filed: Aug. 6, 2001

(65) Prior Publication Data

US 2002/0038949 A1 Apr. 4, 2002

(30) Foreign Application Priority Data

Aug. 9, 2000 (JP) ........................................ 2000-241743

(51) Int. Cl.[7] .............................................. B60R 21/16
(52) U.S. Cl. ...................... 280/743.2; 280/733; 280/740
(58) Field of Search ............................. 280/743.2, 731, 280/740, 728.2, 733

(56) References Cited

U.S. PATENT DOCUMENTS

| | | | | |
|---|---|---|---|---|
| 5,174,601 A | * | 12/1992 | Frantz et al. | ................ 280/740 |
| 5,186,489 A | * | 2/1993 | Imai | ......................... 280/728.2 |
| 5,282,646 A | * | 2/1994 | Melvin et al. | ............... 280/729 |
| 5,464,250 A | * | 11/1995 | Sato | ........................ 280/743.1 |
| 5,573,270 A | | 11/1996 | Sogi et al. | |
| 5,607,183 A | * | 3/1997 | Nishimura et al. | ....... 280/743.2 |
| 5,669,632 A | * | 9/1997 | Johnson et al. | ........... 280/743.2 |
| 5,678,858 A | * | 10/1997 | Nakayama et al. | ...... 280/743.2 |
| 5,848,805 A | | 12/1998 | Sogi et al. | |
| 6,022,046 A | | 2/2000 | Isomura et al. | |
| 6,209,911 B1 | | 4/2001 | Igawa et al. | |
| 6,302,433 B1 | * | 10/2001 | Ellerbrok et al. | ........... 280/729 |
| 6,382,662 B1 | * | 5/2002 | Igawa | ......................... 280/729 |

FOREIGN PATENT DOCUMENTS

WO    WO97/36768    10/1997

* cited by examiner

*Primary Examiner*—Paul N. Dickson
*Assistant Examiner*—Toan C To
(74) *Attorney, Agent, or Firm*—Kanesaka & Takeuchi

(57) ABSTRACT

An airbag is formed of an airbag body having a front surface facing a passenger and a rear surface with a gas inlet opening, a flow adjustment member disposed in the airbag body on a side of the rear surface and having an outlet port for discharging gas toward an outer periphery of the airbag body, and a tether connecting the front surface and the rear surface of the airbag body. The tether is arranged relative to the flow adjustment member so as to face the outlet port in a state where the airbag body is inflated to adjust a gas flow ejected from the outlet port. Thus, the airbag can be inflated evenly as a whole.

6 Claims, 6 Drawing Sheets

Fig. 4
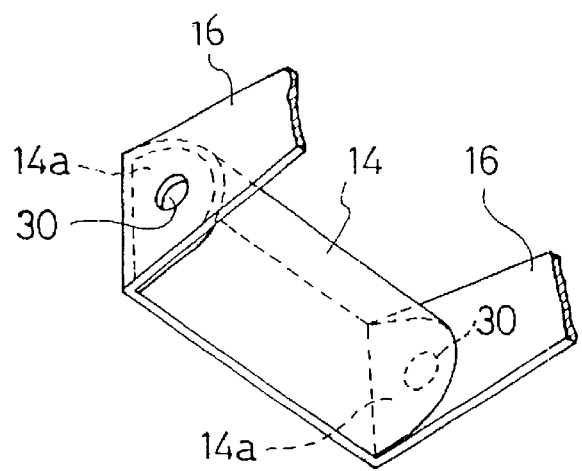
Fig. 5
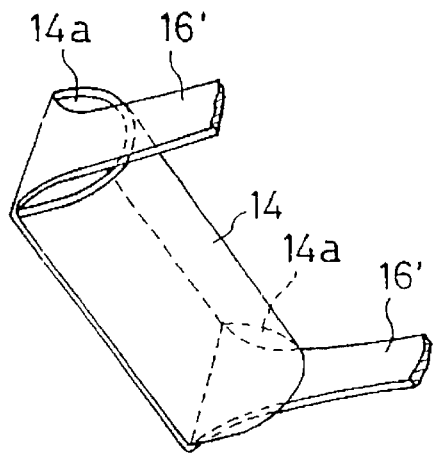
Fig. 6(a)
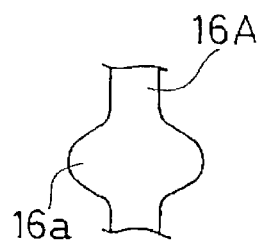
Fig. 6(b)
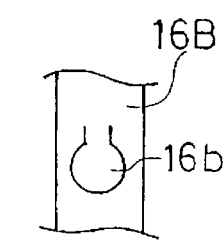
Fig. 6(c)
Fig. 6(d)
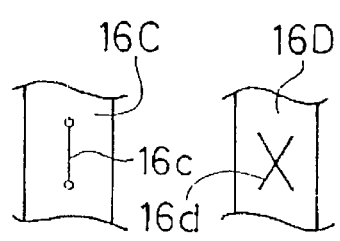

AIRBAG WITH FLOW ADJUSTMENT MEMBER AND TETHER

BACKGROUND OF THE INVENTION AND RELATED ART STATEMENT

The present invention relates to an airbag mounted on a high-speed movable means, such as automobile, to deploy in case of emergency, such as collision, to protect a driver or passenger, and more specifically, to an airbag provided with a tether and a flow adjustment member therein.

An airbag apparatus mounted on a vehicle inflates or deploys an airbag rapidly by gas pressure discharged from a gas generator called an inflator to protect the passenger in case of emergency, such as vehicle collision or the like.

Such an airbag apparatus may be provided with a flow adjustment member for guiding gas into the airbag in order to reduce the speed of the airbag projecting toward the passenger and to inflate and deploy the airbag rapidly in the vertical or lateral direction when the inflator is actuated.

It is also well known to provide a tether connecting a front portion and a rear portion of the airbag to prevent excessive projection of the front portion of the airbag.

In WO97/36768, an airbag provided with a distributing member and a tether therein is disclosed, wherein the tether is disposed at a position away from a gas flow ejecting from the distributing member so that the gas flow from the distributing member is not blocked by the tether.

In the airbag disclosed in WO97/36768 described above, since gas ejected from the distributing member simply goes straight toward the outer periphery of the airbag, the airbag is inflated unevenly toward the gas ejecting direction.

It is an object of the present invention to provide an improved airbag comprising a tether and a flow adjustment member, in which uneven inflation toward a specific direction is prevented and well-balanced inflation as a whole is ensured.

SUMMARY OF THE INVENTION

In the present invention, an airbag comprises an airbag body having a front surface facing a driver or passenger and a rear surface on the opposite side of the front surf ace, the rear surface having an opening for an inflator, a flow adjustment member disposed in the airbag body on the rear surface side and having an outlet port for discharging gas toward the outer periphery of the airbag body, and a tether connecting the front surface and the rear surface of the airbag body. The tether is disposed so as to face the outlet port in the state where the airbag body is inflated.

In such an airbag, gas ejected from the flow adjustment member does not flow straight, but changes the flowing direction by impinging upon the tether. In the course of inflation, the gas ejected from the flow adjustment member pushes the tether toward the periphery of the airbag body, and thus the tether is not tensed and the speed of the airbag projecting toward the passenger is reduced. In this way, the airbag can be inflated evenly as a whole.

one or more tethers may be provided. It is also possible to provide a gas passage, such as an opening or a slit, at the rear portion of the tether, so that dispersion of gas is adjusted. The gas passage may be an opening or a slit. The slit may have various configurations, such as a straight line or a cross-shape.

The tether may have a width that can cover the entire or almost entire outlet port of the flow adjustment member, or a smaller width.

The tether may have a widened portion at the rear portion thereof for receiving gas discharged from the outlet port of the flow adjustment member. In this arrangement, the tether is strongly pressed by the gas ejected from the flow adjustment member, thereby further reducing the speed of the airbag projecting toward the passenger.

It is also applicable to provide a base sheet that takes the position facing the outlet port of the flow adjustment member when the airbag is inflated and to provide the tether continuing into the base seat.

The number of the outlet ports of the flow adjustment member may be optional but one or more. Some of the outlet ports may be oriented toward the front of the airbag. The flow adjustment member may be for example a cylindrical shape, but it is not limited thereto.

BRIEF DESCRIPTION OF THE DRAWINGS

FIG. 4 is a perspective view of a flow adjustment member and a tether according to another embodiment;

FIG. 5 is a perspective view of a flow adjustment member and a tether according to another embodiment;

FIGS. 6(*a*) to 6(*d*) show partial front views showing other structures of the tether;

DETAILED DESCRIPTION OF PREFERRED EMBODIMENTS

Figure 1:
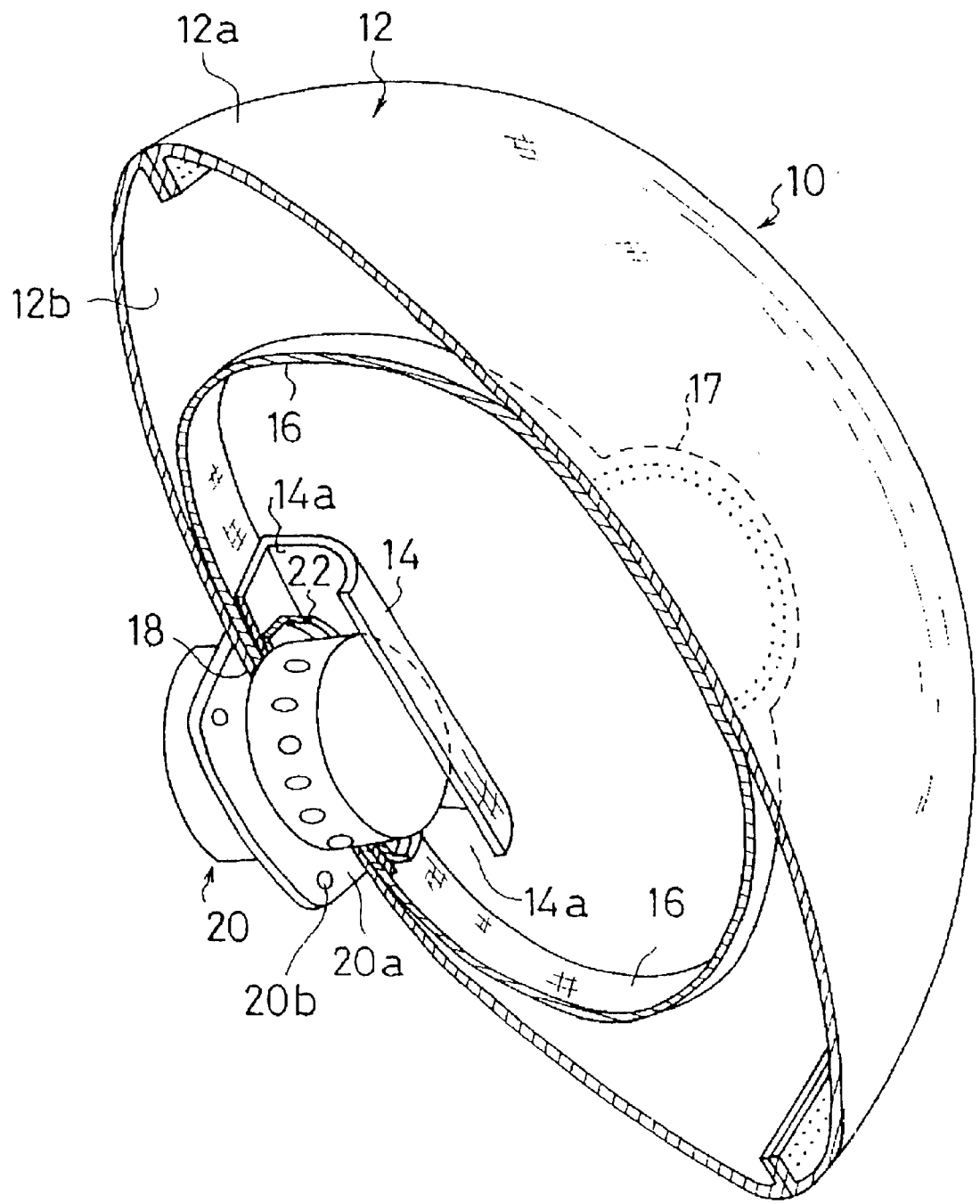
FIG. 1 is a perspective sectional view of an airbag according to an embodiment.
Figure 2:
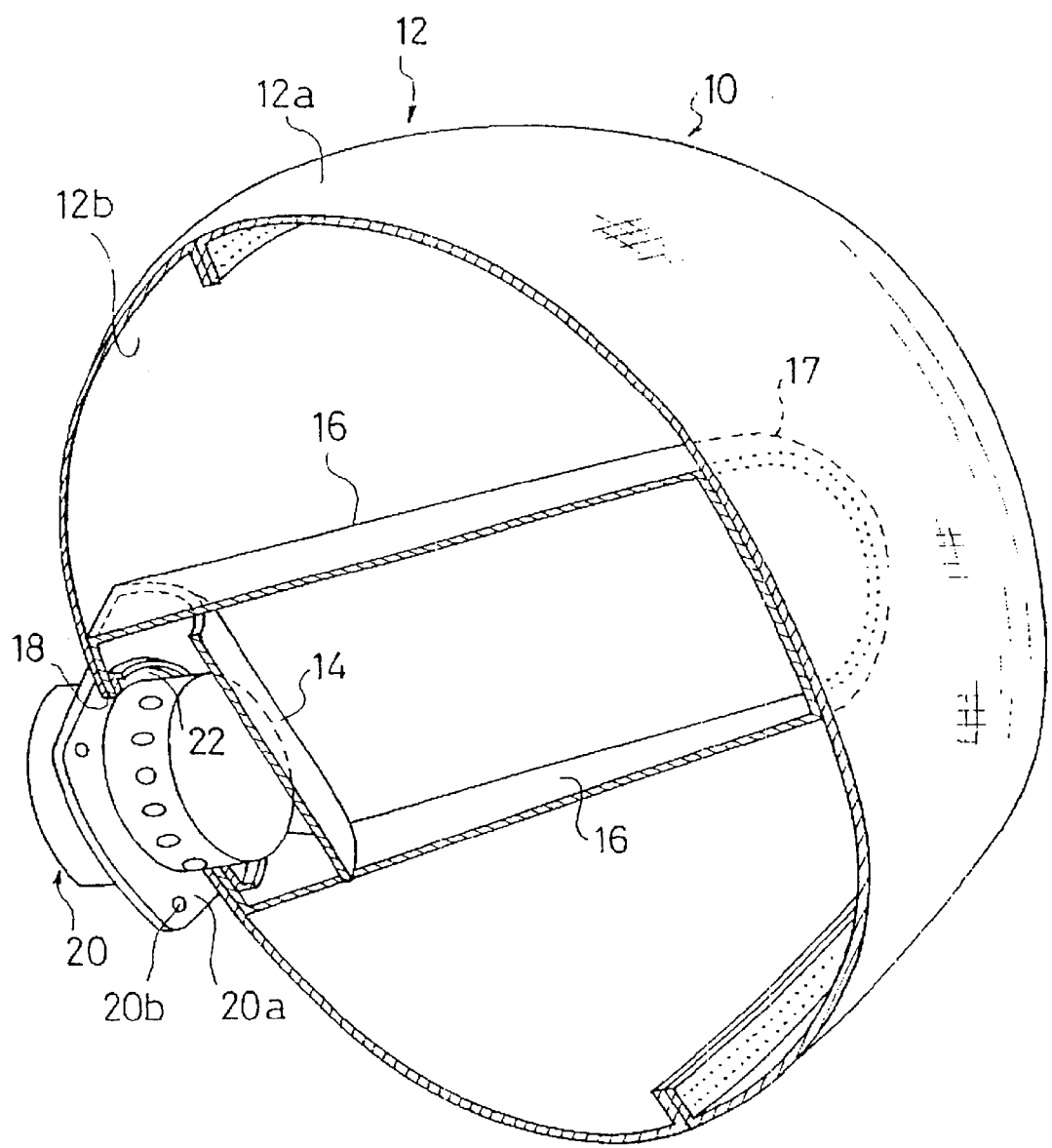
FIG. 2 is a perspective sectional view of the airbag according to the embodiment.
Figure 3A:
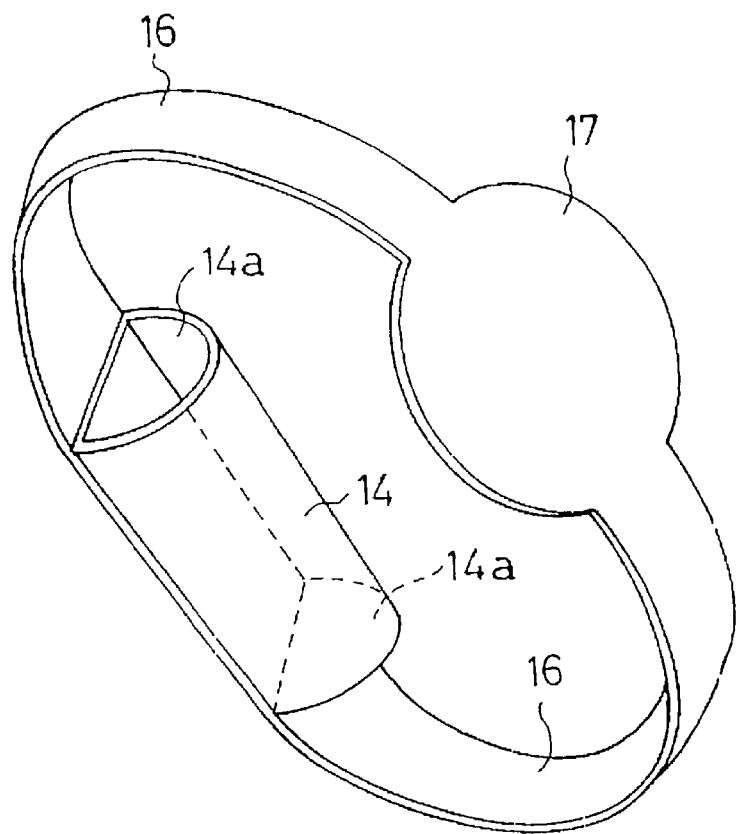
FIGS. 3(*a*) and 3(*b*) are perspective views of a flow adjustment member and a tether shown in FIGS. 1 and 2.

Referring now to the drawings, embodiments of the present invention will be explained. FIG. 1 is a perspective view showing a state in which the airbag is being inflated according to an embodiment of the present invention, FIG. 2 shows a state in which inflation of the airbag is completed. FIG. 3(*a*) is a perspective view showing a flow adjustment member and a tether in the state shown in FIG. 1, and FIG. 3(*b*) is a perspective view showing a rear portion of the tether and the flow adjustment member in the state shown in FIG. 2.

The airbag apparatus comprises a retainer (not shown), an inflator 20 and an airbag 10 mounted on the retainer, and a module cover (not shown) covering the airbag 10. The airbag apparatus is used for the driver's seat, and disposed inside a steering wheel.

The airbag 10 comprises an airbag body 12, a flow adjustment member 14 and a tether 16 within the airbag body 12. The airbag body 12, the flow adjustment member 14 and the rear portion of the tether 16 are all connected to the retainer with a holding ring 22. Stud bolts (not shown) project from the holding ring 22. The stud bolts are inserted through bolt insertion holes (not shown) formed in the airbag body 12, the flow adjustment member 14 and the rear portion of the band-shaped tether 16 respectively, and bolt holes (not shown) formed in the retainer, and nuts are screwed thereon, so that they are connected to the retainer. As shown in FIG. 1, the bolts are inserted through the bolt insertion holes 20b provided on the flange 20a of the inflator 20, so that the inflator 12 is also connected to the retainer. The tether 16 may be integrated with the flow adjustment member 14 so as to extend therefrom.

The airbag body 12 is formed by joining a front panel 12a and a rear panel 12b, for example, by sewing along the peripheral edges thereof. The rear panel 12b and the flow adjustment member 14 are provided with openings 18 respectively at the center thereof for allowing the inflator 20 to insert therethrough. The flow adjustment member 14 and the rear portion of the tether 16 may be joined to the rear panel 12b by means of sewing or the like.

Though it is not shown, the airbag body 12 is formed with a vent hole for discharging gas when the passenger contacts the inflated airbag 10. The front portion of the tether 16 continues to a circular portion 17, and the circular portion 17 is joined to the center portion of the front panel 12a by means of sewing or the like. The rear portion of the tether 16 is interposed between the holding ring 22 and the retainer as described above, and the bolts projecting from the holding ring 22 are inserted through the bolt insertion holes (not shown) on the rear portion of the tether.

The flow adjustment member 14 is almost cylindrical and provided with gas outlet ports 14a on both ends thereof in this embodiment. The flow adjustment member 14 and the tethers 16 are disposed in such a manner that the tethers 16 take the positions to face the outlet ports 14a when the airbag is inflated as shown in FIG. 2.

In the airbag apparatus having the airbag constructed in such a manner, when the automobile encounters an emergency circumstance, such as vehicle collision or rolling-over, the inflator 20 ejects gas, so that the airbag 10 starts inflating. In association with initiation of inflation of the airbag 10, the module cover is torn off and the airbag 10 is inflated.

In this case, the gas first inflates the flow adjustment member 14, and then passes through the outlet ports 14a of the flow adjustment member 14, to inflate the airbag body 12. In the initial stage of inflation of the airbag 10, since the tethers 16 are located away from the outlet ports 14a, the gas ejected from the outlet ports 14a goes almost straight, and inflates the airbag body 12 mainly in the longitudinal direction of the flow adjustment member 14, i.e. the direction connecting two outlet ports 14a.

When the airbag 10 is being inflated larger and larger, the tethers 16 approach gradually to the outlet ports 14a, whereby the gas ejected from the outlet ports 14a impinges upon the tethers 16 and is dispersed, so that the airbag body 12 is inflated larger both in the longitudinal direction and the direction crossing the flow adjustment member 14.

Figure 3B:
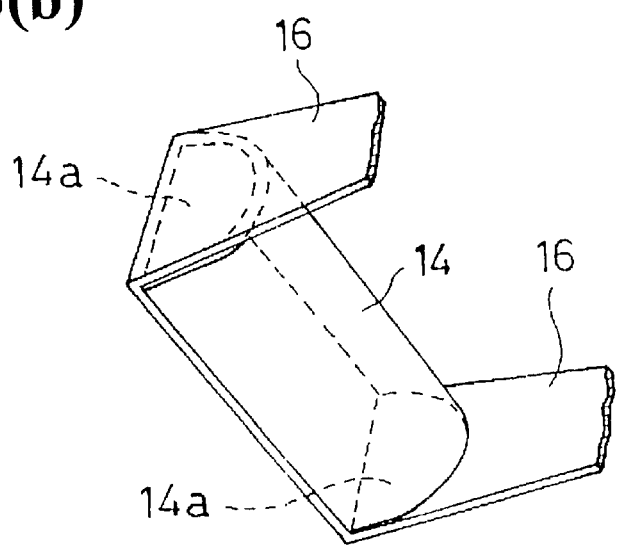

After a while, inflation of the airbag body 12 is almost completed as shown in FIG. 2, and the tethers 16 are tensed. In this situation, the tethers 16 face the outlet ports 14a of the flow adjustment member 14 as shown in FIG. 3(b).

In the course of inflation before it reaches this completion of inflation, as shown in FIG. 1, the gas ejected from the outlet ports 14a presses the tethers 16 toward the periphery. Therefore, the tethers 16 are not tensed and thus the speed of the airbag body 12 projecting toward the passenger is lowered. In this way, the airbag body 12 can be inflated evenly as a whole.

Referring now to FIG. 4 to FIG. 8, other configurations of the tether to be preferably employed in this embodiment will be described.

In FIG. 4, the tether 16 is provided with opening 30 on the rear portion thereof, so that gas is ejected through the opening 30 immediately before completion of inflation of the airbag. Other structures are the same as the embodiment shown above.

In FIG. 5, at least a portion of the tether 16' facing the outlet port 14a may be reduced in width so that gas can pass through the sides of the tether 16' immediately before the completion of inflation. Other constructions are the same as the previous embodiment.

In FIG. 6(a), the tether 16A has a widened portion 16a large in width at the rear so that gas pressure ejected from the outlet port 14a is received by the widened portion 16a to keep the tether 16A in the sagging state as long as possible.

In the structure shown in FIG. 6(b), the tether 16B is formed with a flap 16b at the rear portion thereof so that gas ejected from the outlet port 14a forces the flap 16b to open to pass therethrough.

The tethers 16C and 16D shown in FIG. 6(c) and 6(d) are formed with slits 16c, 16d respectively at the rear portion thereof so that gas ejected from the outlet port 14a passes through the slit 16c or 16d. Though the slit 16c is a straight line and the slit 16d has a cross-shape, various shapes, such as an asterisk, may be employed.

Figure 7:
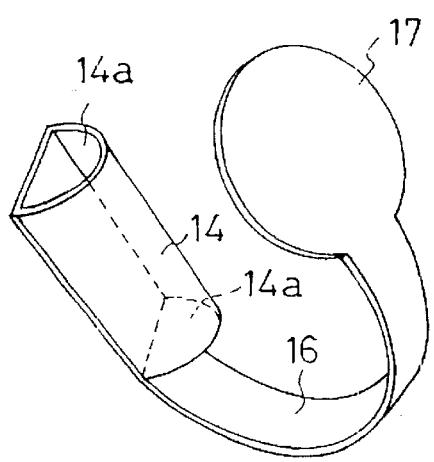
FIG. 7 is a perspective view of a flow adjustment member and a tether according to another embodiment.
Figure 8:
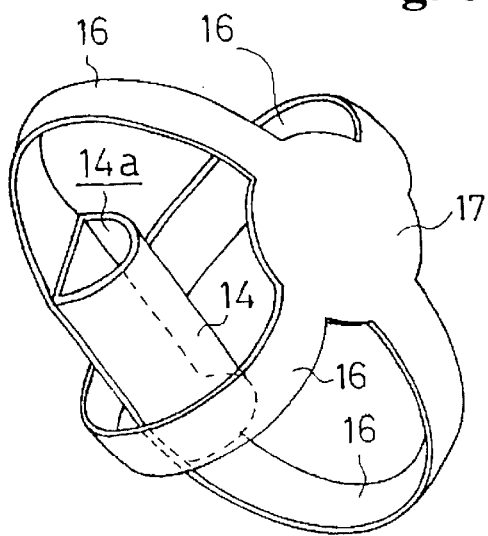
FIG. 8 is a perspective view of a flow adjustment member and a tether according to another embodiment.
Figure 9A:
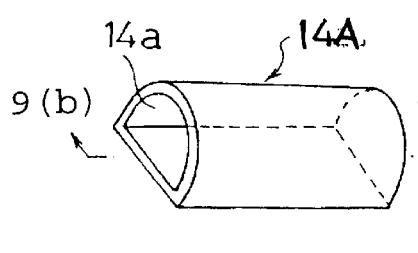
FIG. 9(*a*) is a perspective view of a flow adjustment member used in a different embodiment, and FIG. 9(*b*) is a cross sectional view taken along line 9(*b*)—9(*b*) in FIG. 9(*a*)
Figure 9B:
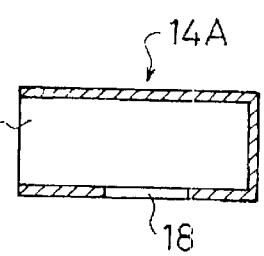
Figure 10A:
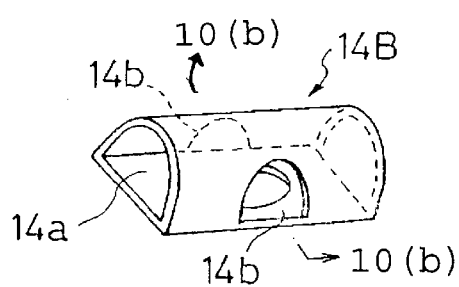
FIG. 10(*a*) is a perspective view of a flow adjustment member used in a different embodiment, and FIG. 10(*b*) is a cross sectional view taken along line 10(*b*)—10(*b*) in FIG. 10(*a*)
Figure 10B:
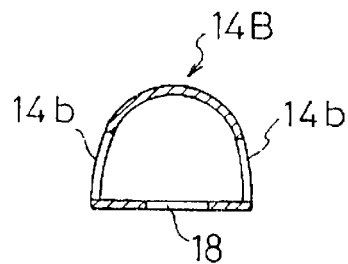
Figure 11A:
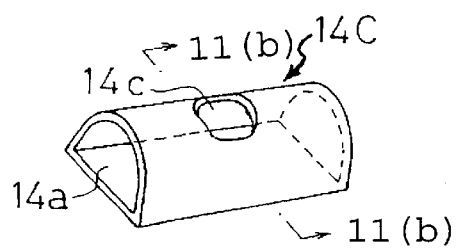
FIG. 11(*a*) is a perspective view of a flow adjustment member used in a different embodiment, and FIG. 11(*b*) is a cross sectional view taken along line 11(*b*)—11(*b*) in FIG. 11(*a*)
Figure 11B:
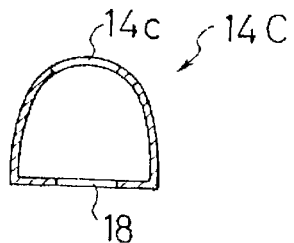

In the structure shown in FIG. 7, there is provided only one tether 16, and in the structure shown in FIG. 8, four tethers 16 are provided. Though it is not shown, the structure eliminating one tether from the structure shown in FIG. 8 and having three tethers may also be employed. Likewise, though it is not shown, there may be provided five or more tethers.

FIG. 9(a) to FIG. 11(a) show other shapes of the flow adjustment member. The flow adjustment member 14A shown in FIGS. 9(a) and 9(b) has only one outlet port 14a. The flow adjustment member 14B shown in FIGS. 10(a) and 10(b) has additional two outlet ports 14b respectively on both side surfaces thereof. It is also possible to provide one outlet port 14b only in one of the side surfaces, and to provide two or more outlet ports 14b in one side surface. The flow adjustment member 14C shown in FIGS. 11(a) and 11(b) has an outlet port 14c in the top surface. The outlet port 14c in the top surface may be provided also for the flow adjustment members 14A, 14B described above. More than one outlet ports 14c may be provided as well.

Figure 12:
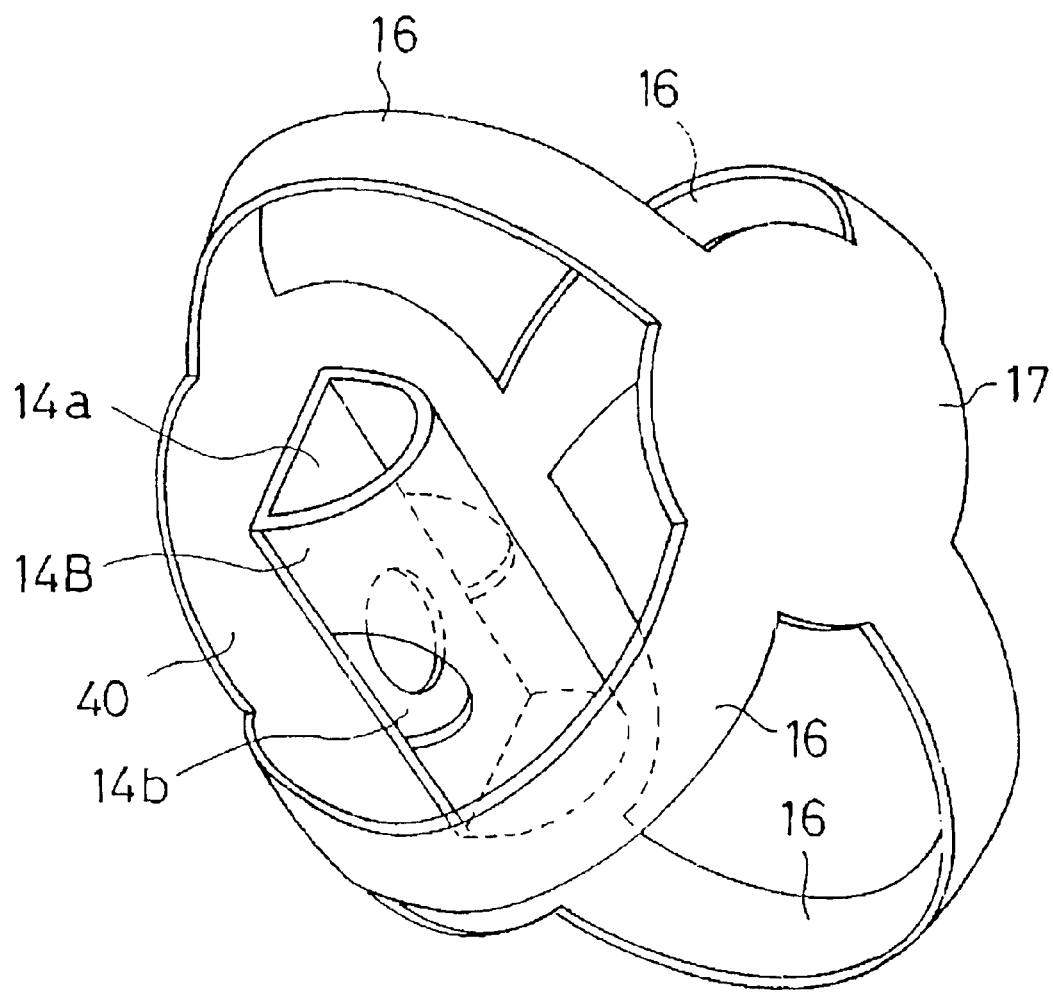
FIG. 12 is a perspective view of a flow adjustment member and a tether used in another different embodiment.

In FIG. 12, a base sheet 40 is disposed so as to surround the flow adjustment member 14B having four outlet ports 14a, 14b in total, and four tethers 16 are provided so as to extend from the base sheet 40. The base sheet 40 is almost oval in shape and provided between the flow adjustment member 14B and the rear panel. The base sheet 40 may be joined to the flow adjustment member 14B or the rear panel, or both by suturing or the like.

When inflation of the airbag is almost completed, the base sheet 40 takes the position facing all the outlet ports 14a, 14b, and surrounds the entire side periphery of the flow adjustment member 14B. The base sheet 40 is also provided with an opening, through which the inflator 20 is inserted, so that it can be mounted to the retainer together with the flow adjustment member 14B and the airbag body 12.

The embodiments relate to the airbag for the driver's seat, but the present invention may be applied to the various airbags, such as the airbag for the front passenger seat.

As described above, according to the present invention, the airbag can be evenly inflated as a whole.

While the invention has been explained with reference to the specific embodiments of the invention, the explanation is illustrative, and the invention is limited only by the appended claims.

What is claimed is:

1. An airbag, comprising:
   an airbag body having a front surface for facing a passenger and a rear surface on a side opposite to the front surface, said rear surface having a gas inlet opening;
   a flow adjustment member disposed in the airbag body on a side of the rear surface, and having an outer portion covering the gas inlet opening to block gas entering the airbag body and at least one outlet port on a side of the outer portion for discharging the gas toward an outer periphery of the airbag body; and
   a tether connecting the front surface and the rear surface of the airbag body, said tether being arranged relative to the flow adjustment member so as to face the at least one outlet port in a state where the airbag body is inflated, to thereby adjust a gas flow ejected from the at least one outlet port.

2. An airbag as set forth in claim 1, wherein said tether includes a passage for allowing the gas ejected from the at least one outlet port of the flow adjustment member to pass at a rear portion of the tether.

3. An airbag as set forth in claim 1, wherein said tether includes a widened portion for receiving the gas ejected from the at least one outlet port of the flow adjustment member at a rear portion of the tether.

4. An airbag as set forth in claim 1, wherein said tether includes a base sheet extending to a rear end of the tether, said base sheet being located at a position facing the outlet port of the flow adjustment member when the airbag is inflated.

5. An airbag as set forth in claim 4, wherein said base sheet is disposed between the flow adjustment member and the rear surface so that when the airbag body is inflated, the base sheet blocks the at least one outlet port.

6. An airbag as set forth in claim 1, wherein said flow adjustment member has an outer portion covering the gas inlet opening to block the gas entering the airbag body, and at least two outlet ports on two sides of the outer portion, said tether having at least two straps extending from the rear surface to the front surface so that as the airbag body is inflated, the two straps gradually covers the at least two outlet ports to restrict flow of the gas from the outlet ports.

\* \* \* \* \*